US012794984B2

(12) United States Patent
Ko

(10) Patent No.: US 12,794,984 B2
(45) Date of Patent: Nov. 10, 2026

(54) APPARATUS AND METHOD OF PROVIDING CONNECTED CAR SERVICE

(71) Applicants: Hyundai Motor Company, Seoul (KR); Kia Corporation, Seoul (KR)

(72) Inventor: Jae Yoon Ko, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 89 days.

(21) Appl. No.: 18/800,889

(22) Filed: Aug. 12, 2024

(65) Prior Publication Data

US 2025/0294076 A1 Sep. 18, 2025

(30) Foreign Application Priority Data

Mar. 12, 2024 (KR) ........................ 10-2024-0034662

(51) Int. Cl.

| | |
|---|---|
| ***H04L 67/125*** | (2022.01) |
| ***H04L 12/66*** | (2006.01) |
| ***H04L 41/0663*** | (2022.01) |
| ***H04L 41/0681*** | (2022.01) |
| ***H04L 67/12*** | (2022.01) |
| ***H04L 69/40*** | (2022.01) |
| ***H04W 4/40*** | (2018.01) |

(52) U.S. Cl.
CPC ............ *H04L 67/125* (2013.01); *H04L 69/40* (2013.01)

(58) Field of Classification Search
CPC ....... H04L 67/125; H04L 69/40; H04L 67/12; H04L 41/0663; H04L 12/66; H04L 41/0681; H04W 4/40
See application file for complete search history.

(56) References Cited

U.S. PATENT DOCUMENTS

| | | | | |
|---|---|---|---|---|
| 5,956,489 | A * | 9/1999 | San Andres | G06F 11/201 714/E11.097 |
| 6,289,390 | B1 * | 9/2001 | Kavner | G06F 9/547 709/200 |
| 8,370,474 | B1 * | 2/2013 | Reeves | G06F 16/00 709/227 |
| 9,189,355 | B1 * | 11/2015 | Moturu | G06F 11/3495 |
| 9,672,114 | B2 * | 6/2017 | Cáliz | G06F 11/14 |
| 11,928,532 | B1 * | 3/2024 | Eoo | G06F 21/606 |
| 2008/0201360 | A1 * | 8/2008 | Kohli | H04L 63/10 |
| 2012/0124413 | A1 * | 5/2012 | Bauer | H04L 67/1034 714/4.11 |
| 2016/0088022 | A1 * | 3/2016 | Handa | G06F 16/972 726/1 |

(Continued)

*Primary Examiner* — Oleg Survillo
(74) *Attorney, Agent, or Firm* — Banner & Witcoff, Ltd.

(57) ABSTRACT

The disclosure relates to an apparatus and method for providing connected car service capable of effectively responding to the event of server failure. A system of providing connected car services may include a gateway server configured to, based on receiving a first service request from a vehicle terminal, forward the first service request to a service processing server responsible for processing a service corresponding to the first received service request. The gateway server may detect a failure in the service processing server by receiving, from the service processing server, a service failure notification. The gateway server may, based on receiving a second service request after detecting the failure in the service processing server, transmit a service error response to the vehicle terminal.

20 Claims, 3 Drawing Sheets

(56) References Cited

U.S. PATENT DOCUMENTS

| | | | | |
|---|---|---|---|---|
| 2016/0219494 | A1* | 7/2016 | Ko | H04W 8/005 |
| 2018/0375828 | A1* | 12/2018 | Rawat | H04L 12/4633 |
| 2020/0126375 | A1* | 4/2020 | Kim | G08B 3/105 |
| 2020/0154261 | A1* | 5/2020 | Ko | H04W 84/18 |
| 2020/0412826 | A1* | 12/2020 | Levy Nahum | H04L 43/0864 |
| 2021/0051573 | A1* | 2/2021 | Miklös | H04W 48/18 |
| 2021/0144517 | A1* | 5/2021 | Guim Bernat | G06F 9/5072 |
| 2021/0306203 | A1* | 9/2021 | Landais | H04L 67/02 |
| 2022/0107848 | A1* | 4/2022 | Wang | G06F 9/5083 |
| 2023/0237190 | A1* | 7/2023 | Padmanabhan | G06F 21/6245<br>726/27 |
| 2025/0294076 | A1* | 9/2025 | Ko | H04L 67/125 |

* cited by examiner

APPARATUS AND METHOD OF PROVIDING CONNECTED CAR SERVICE

CROSS REFERENCE TO RELATED APPLICATION

The present application claims priority to Korean Patent Application No. 10-2024-0034662, filed on Mar. 12, 2024, the entire contents of which is incorporated herein for all purposes by this reference.

FIELD OF THE PRESENT DISCLOSURE

The disclosure relates to an apparatus and method for providing connected car service capable of effectively responding to the event of server failure.

BACKGROUND

A significant portion of recently released vehicles integrate Connected Car Service (CCS) functionality, enabling them to deliver, to the user, diverse information such as weather and route information via wireless communication. To support CCS functionality, vehicles need to be equipped with a CCS terminal that communicates with a CCS system that provides CCS via mobile wireless communication networks.

Typically, a CCS terminal attempts to request services from the CCS system and, if no response is received within a certain period (i.e., timeout), it retries the service request at regular intervals. However, if a failure occurs in the server providing information for individual services within the CCS system, the CCS terminal may not be able to detect the server failure and may continue to attempt to request service again at each timeout. This can lead to an increase in data traffic within the CCS system, causing servers to take longer to address failures.

One or more features described above are intended merely to aid in the understanding of the background of the disclosure, and should not be construed as recognizing the prior art that is known to those skilled in the art.

SUMMARY

Various aspects of the present disclosure is directed to providing an apparatus and method for providing connected car service (CCS) capable of effectively responding to server failures.

The technical objects of one or more example embodiment of the present disclosure are not limited to the aforesaid, and other objects not described herein with be clearly understood by those skilled in the art from the descriptions below.

According to one or more example embodiments, a system may include a gateway server. The gateway server may be configured to: based on receiving a first service request from a vehicle terminal associated with a vehicle, forward the first service request to a service processing server responsible for processing a service corresponding to the received first service request; detect a failure in the service processing server by receiving, from the service processing server, a service failure notification; based on receiving a second service request after detecting the failure in the service processing server, transmit a service error response to the vehicle terminal; and based on at least one of the first service request or the second service request, cause the service processing server to provide connected car services to the vehicle.

The gateway server may be further configured to, based on receiving the second service request after detecting a failure in the service processing server, stop forwarding the second service request to the service processing server.

The gateway server may be further configured to, based on receiving the second service request after detecting a failure in the service processing server, store information associated with the second service request.

The gateway server may be further configured to, after detecting recovery of the service processing server from the failure, transmit a service availability notification to the vehicle terminal based on the stored information.

The gateway server may be configured to detect the recovery of the service processing server based on receiving a service recovery notification from the service processing server.

The gateway server may be further configured to transmit the service error response to prevent the vehicle terminal from retransmitting an additional service request.

According to one or more example embodiments of the present disclosure, a system may include a plurality of service processing servers, and a gateway server. The gateway server may be configured to, based on receiving, from a vehicle terminal associated with a vehicle, a first service request for a first service, forward the first service request to a first service processing server of the plurality of service processing servers; based on receiving a second service request for a second service, forward the second service request to a second service processing server of the plurality of service processing servers; based on receiving a third service request for a specific service handled by one of the plurality of service processing servers after detecting a failure in a corresponding service processing server, transmit a service error response to a corresponding vehicle terminal third transmitted the service request for the specific service; and, based on the first service request, cause the first service processing server to provide connected car services to the vehicle.

According to one or more example embodiments of the present disclosure, a method may include forwarding, based on receiving a first service request by a gateway server from a vehicle terminal associated with a vehicle, the first service request to a service processing server responsible for processing a service corresponding to the first service request; detecting a failure in the service processing server by receiving, from the service processing server, a service failure notification; transmitting, based on receiving a second service request after detecting the failure in the service processing server, a service error response to the vehicle terminal; and, based on at least one of the first service request or the second service request, causing the service processing server to provide connected car services to the vehicle.

The method further includes stopping, based on receiving the second service request by the gateway server after detecting a failure in the service processing server, forwarding the second service request to the service processing server.

The method may further include storing, based on receiving by the gateway server the second service request after detecting a failure in the service processing server, information associated with the service request.

The method may further include transmitting, after detecting recovery of the service processing server from the failure, a service availability notification to the vehicle terminal based on the stored information.

Detecting the recovery of the service processing server may be based on receiving a service recovery notification from the service processing server.

The gateway server may transmit the service error response to prevent the vehicle terminal from retransmitting the second service request.

According to at least one embodiment of the disclosure, when there is an issue in the service processing server, the gateway server may send an error code to the vehicle-side CCS terminal, thereby preventing unnecessary service re-requests and reducing server-side traffic.

Additionally, upon service restoration, a notification is sent to the vehicle-side CCS terminal, informing the occupants of the availability of the service.

The advantageous effects of the disclosure are not limited to the aforesaid, and other effects not described herein with can be clearly understood by those skilled in the art from the descriptions below.

Figure 1:
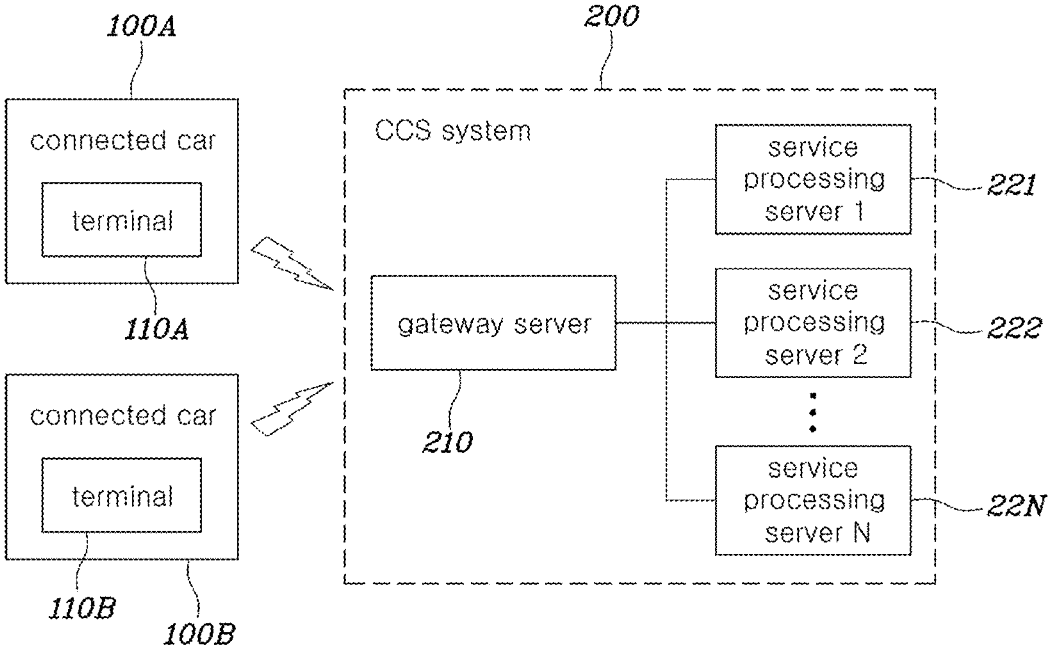
FIG. 1 is a diagram illustrating an environment configuration for providing connected car services.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Hereinafter, descriptions are made of one or more example embodiments disclosed in the present specification with reference to the accompanying drawings in which the same reference numbers are assigned to refer to the same or like components and redundant description thereof is omitted. As used in the following description, the suffix "module" and "unit" are granted or used interchangeably in consideration of easiness of description but, by itself, having no distinct meaning or role. In addition, detailed descriptions of well-known technologies related to the example embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical spirit disclosed herein, and it should be understood that the embodiments include all changes, equivalents, and substitutes within the spirit and scope of the disclosure.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

In addition, it should be noted that the terms "unit" or "control unit" found in the names of motor control units (MCUs) or similar devices are typically used to describe controllers responsible for specific functions of a vehicle, rather than indicating a generic function unit. For example, each controller may include a communication device communicating with another controller or sensor to control a function in charge, a memory that stores operating system or logic instructions and input/output information, and one or more processors for determination, operation, and decision-making necessary for functions in charge.

FIG. 1 is a diagram illustrating an environment configuration for providing connected car services.

With reference to FIG. 1, the implementation of a connected car service may be achieved through vehicles (hereinafter referred to as "connected cars") 100A and 100B equipped with CCS terminals 110A and 110B, and the CCS system 200. Although only two connected cars 100A and 100B are depicted for convenience of explanation, it is obvious that more connected cars may participate in CCS.

The terminals 110A and 110B equipped in the respective connected cars 100A and 100B may transmit a service request to the CCS system 200 via a wireless communication network based on a command input from a passenger or a predetermined setting and, upon receiving a service response from the CCS system 200 in response to the service request, output information corresponding to the service response through an appropriate output means (e.g., display, speaker, etc.). For this purpose, the terminals 100A and 100B may be equipped with wireless communication modems (not shown).

The CCS system 200 may include a gateway server 210 and one or more service processing servers 221, 222, . . . , 22N.

The gateway server 210 may exchange data such as service requests and service responses with the terminals 110A and 110B via a wireless communication network. In addition, upon receiving a service request, the gateway server 210 may forward the service request to the corresponding service processing server, and upon completion of service processing by the service processing server and delivery of the service result, the gateway server may transmit the corresponding service response to the terminal that requested the service.

The service processing servers 221, 222, . . . , 22N may be configured to handle different services in a server-wise manner. For example, service processing server 1 221 may provide weather services, while service processing server 2 222 may offer traffic information services. However, this is just an example and is not necessarily limited thereto. For example, a single service processing server may handle a plurality of services, or a plurality of service processing servers may be implemented to distribute the processing of a single service.

Particularly, the gateway server 210 may, upon detecting failure in at least some of the service processing servers 221, 222, . . . , 22N and then receiving a service request corresponding to the service handled by the failed service processing server from the CCS terminal installed in an arbitrary connected car, choose not to forward the service request to the service processing server but instead perform a service error return to the CCS terminal that sent the service request. Service error return may take the form of setting a specific field in the service response to a predetermined value or sending a different type of message rather than a service response, but this is merely illustrative and not necessarily limited thereto. Upon receiving the service error return, the CCS terminal does not perform service re-request but instead may display service failure notification information through an output means. This allows the CCS terminal to refrain from performing service re-requests based on timeouts.

Furthermore, the gateway server 210 may store information about the CCS terminal that has sent the service request to the service processing server where the failure has occurred. In this case, the gateway server 210 may use the stored information to send, when detecting that the failed service processing server has been restored, a message to the CCS terminal indicating that the service is currently available for use.

The method for the gateway server 210 to detect the occurrence or recovery of failures in each service processing server 221, 222, . . . , 22N may be implemented in such a way that the service processing server automatically sends a predetermined form of message indicating the occurrence of a failure to the gateway server 210 when the communication functionality between the gateway server 210 and the service processing server is normal (e.g., only the service processing functionality is affected). Upon receiving the message indicating a failure, the gateway server 210 may automatically handle the failure registration process and take corrective actions such as performing error returns (responses) when there are requests for the corresponding service, as previously described. It may also be possible for the administrator of each service processing server 221, 222, . . . , 22N to notify the administrator of the gateway server 210 about the occurrence or recovery of failures, and accordingly, the administrator of the gateway server 210 may set the status values for each service processing server.

Hereinafter, a detailed description of the process of providing CCS is provided with reference to FIGS. 2 and 3, based on the CCS provisioning environment illustrated in FIG. 1.

Figure 2:
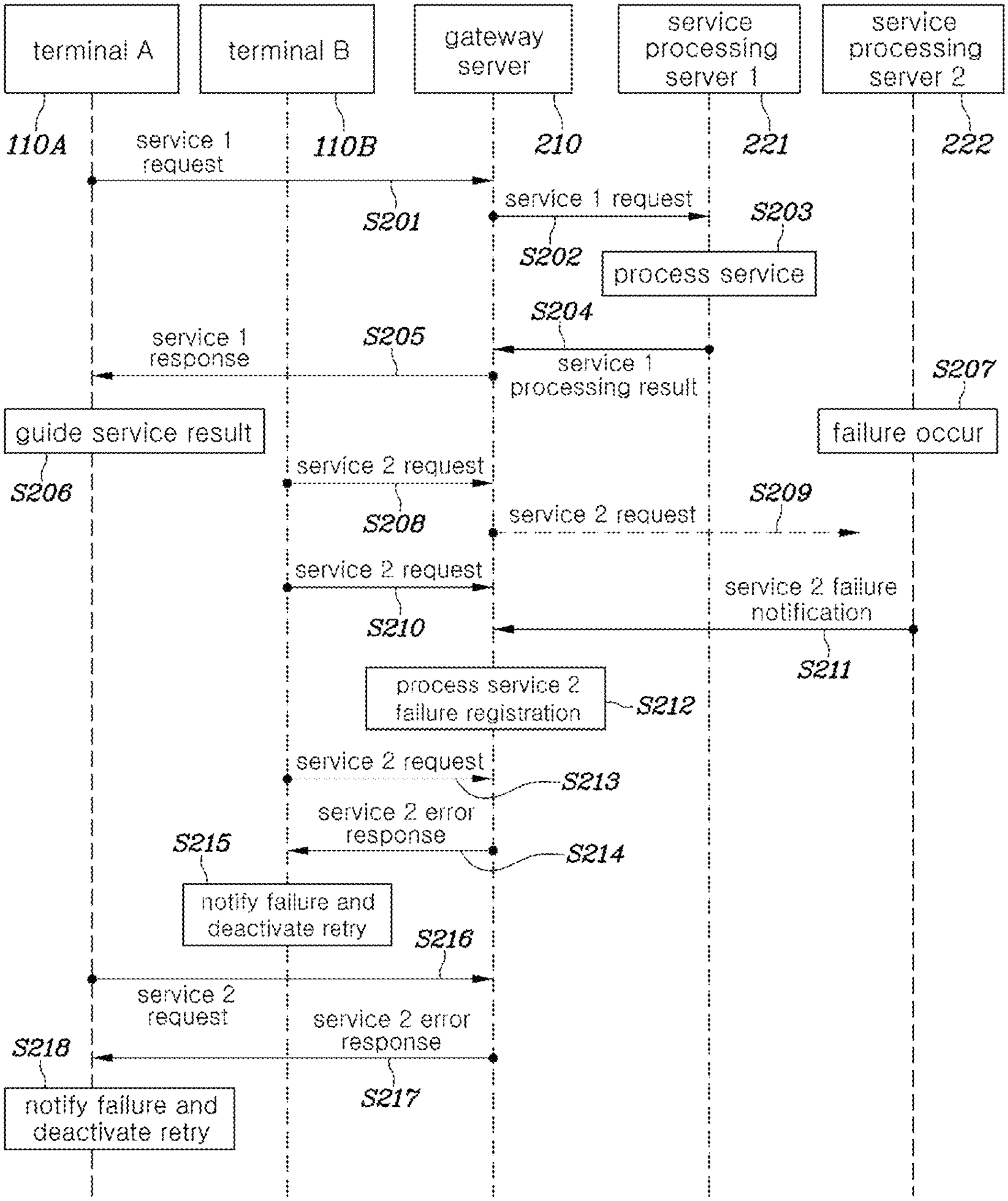
FIG. 2 is a signal flow diagram illustrating the process of providing connected car services.
Figure 3:
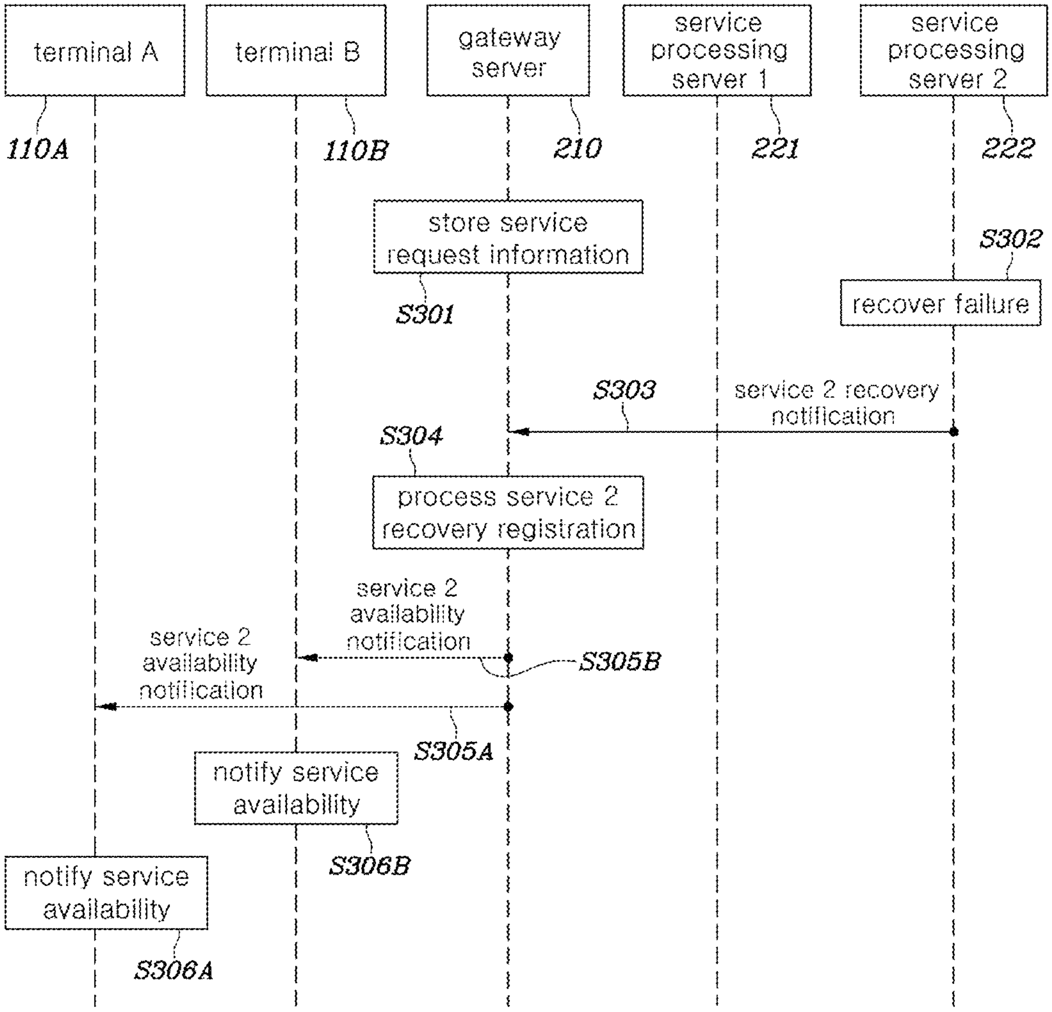
FIG. 3 is a signal flow diagram illustrating the process of providing connected car services following the recovery from a failure within the service processing server.

FIG. 2 illustrates the process of providing connected car services, and FIG. 3 illustrates the process of providing connected car services following the recovery from a failure within the service processing server.

In both FIG. 2 and FIG. 3, it is assumed, for convenience of explanation, that two CCS terminals 110A and 110B (i.e., two connected cars) and two service processing servers 221 and 222 each responsible for processing different services are involved in CCS provisioning.

With reference to FIG. 2, upon receiving a service 1 request transmitted from terminal A 110A to the CCS system at step S201, the gateway server 210 forwards, at step S202, the request to service processing server 1 221 responsible for handling service 1. Service processing server 1 221 may process the service 1 request at step S203 and transmit the processing result to the gateway server 210 at step S204.

The gateway server 210 may transmit the service 1 response corresponding to the service 1 processing result to terminal A 110A at step S205, and upon receiving the service 1 response, terminal A 110A may output (guide) the corresponding service result at step S206.

The steps described so far (S201 to S206) may correspond to the typical service processing process when there is no failure in the service processing server.

Terminal B 110B transmits a service 2 request to the gateway server 210 at step S208 without being aware of the occurrence of a failure in service processing server 2 222 at step S207, and upon receiving the service 2 request, the gateway server 210, which has not yet received a failure notification and thus has not initiated the failure hand process, forwards the service 2 request to service processing server 2 222 at step S209. In this case, service processing server 2 (222) in a failure state cannot receive or process the service 2 request and thus cannot send a response to the service 2 request. Therefore, terminal B 110B does not receive a response to the service 2 request, resulting in a timeout of the initial request and retransmission of a service 2 request to the gateway server 210 at step S210.

Afterward, when the gateway server 210 becomes aware of the failure in service processing server 2 222 through methods such as notification from service processing server 2 222 to the gateway server 210 at step S211, the gateway server 210 may perform failure registration process for service 2 at step S212. Accordingly, when the gateway server 210 receives a service 2 re-request from terminal B 110B at step S213, the gateway server 210 may transmit a service 2 error response (i.e., error return) to terminal B at step S214, instead of forwarding the request to service processing server 2 222. That is, the gateway server 210 discontinues forwarding the request to service processing server 2 222, thereby not passing on the request.

Upon receiving the service 2 error response, terminal B 110B may display a service failure notification and deactivate (or discontinue) the retry of service 2 at step S215.

When terminal A 110A requests for service 2 at step S216, the gateway server 210 may transmit an error response to terminal A 110A at step S217 similar to the handling for terminal B 110B, and terminal A 110A may also perform failure notification and deactivate retry at step S218.

Hereinafter, reference will be made to FIG. 3. FIG. 3 may represent a continuation of the process depicted in FIG. 2.

With reference to FIG. 3, the gateway server 210 may store, at step S301, the detail (e.g., request time, requesting terminal, etc.) of the received service 2 requests (i.e., the requests received at steps S213 and S216) after the failure registration process at step S212. After the failure of service processing server 2 222 is restored at step S302, and in case of recognizing the restoration of service processing server 2 222, such as receiving a recovery notification at step S303), the gateway server may perform recovery registration process for service 2 at step S304.

Accordingly, the gateway server 210 may transmit, at steps S305A and S305B, service availability notifications, based on the stored information, indicating that service 2 is currently available to the terminals 110A and 110B requested service 2, and the terminals 110A and 110B may each output service availability notification information at steps S306A and S306B.

The implementation described herein may mitigate the data traffic surge caused by the service re-requests from connected car terminals during server failures in scenarios with growing connected car populations and rising service demands. In particular, by blocking the delivery of service request messages to the affected service processing server system during the occurrence of a failure, it becomes possible to enable quick failure recovery and resumption of service, thereby enhancing the quality of connected car services. Furthermore, as the information on service recovery status is transmitted to the CCS terminals that initiated the corresponding service requests, users can conveniently ascertain whether the services have been restored.

Furthermore, the term related to a control device such as “controller”, “control apparatus”, “control unit”, “control device”, “control module”, or “server”, etc refers to a hardware device including a memory and a processor configured to execute one or more steps interpreted as an algorithm structure. The memory stores algorithm steps, and the processor executes the algorithm steps to perform one or more processes of a method in accordance with various example embodiments of the present disclosure. The control device according to one or more example embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various example embodiments of the present disclosure.

The aforementioned disclosure can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

Each operation described above may be performed by a control device, and the control device may be configured by a plurality of control devices, or an integrated single control device.

The memory and the processor may be provided as one chip, or provided as separate chips.

The scope of the present disclosure includes software or machine-executable commands (e.g., an operating system, an application, firmware, a program, etc.) for enabling operations according to the methods described herein to be executed on an apparatus or a computer, a non-transitory computer-readable medium including such software or commands stored thereon and executable on the apparatus or the computer.

The control device may be implemented in a form of hardware or software, or may be implemented in a combination of hardware and software.

Furthermore, the terms such as “unit”, “module”, etc. included in the specification mean units for processing at least one function or operation, which may be implemented by hardware, software, or a combination thereof.

For convenience in explanation and accurate definition in the appended claims, the terms “upper”, “lower”, “inner”, “outer”, “up”, “down”, “upwards”, “downwards”, “front”, “rear”, “back”, “inside”, “outside”, “inwardly”, “outwardly”, “interior”, “exterior”, “internal”, “external”, “forwards”, and “backwards” are used to describe features with reference to the positions of such features as displayed in the figures. It will be further understood that the term “connect” or its derivatives refer both to direct and indirect connection.

The term “and/or” may include a combination of a plurality of related listed items or any of a plurality of related listed items. For example, “A and/or B” includes all three cases such as “A”, “B”, and “A and B”.

In the present specification, unless stated otherwise, a singular expression includes a plural expression unless the context clearly indicates otherwise.

As described herein, “at least one of A and B” may refer to “at least one of A or B” or “at least one of combinations of one or more of A and B”. In addition, “one or more of A and B” may refer to “one or more of A or B” or “one or more of combinations of one or more of A and B”.

It should be understood that a term such as “include” or “have” is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The descriptions herein are presented for purposes of illustration and description. They are not intended to be exhaustive or to limit the present disclosure to the precise forms disclosed, and obviously many modifications and variations are possible in light of the above teachings. The one or more example embodiments were chosen and described in order to explain certain principles of the disclosure and their practical application, to enable others skilled in the art to make and utilize various example embodiments of the present disclosure, as well as various alternatives and modifications thereof. It is intended that the scope of the present disclosure be defined by the Claims appended hereto and their equivalents.

What is claimed is:

1. A method comprising:

forwarding, based on receiving a first service request by a gateway server from a vehicle terminal associated with a vehicle, the first service request to a service processing server responsible for processing a service corresponding to the first service request;

transmitting, based on receiving a service response from the service processing server, the service response to the vehicle terminal;

detecting a failure in the service processing server by receiving, from the service processing server, a service failure notification; and based on receiving a second service request by the gateway server after detecting the failure in the service processing server;

transmitting a service error response to the vehicle terminal; and stopping forwarding the second service request, to the service processing server.

2. The method of claim 1, further comprising storing, based on receiving by the gateway server the second service request after detecting the failure in the service processing server, information associated with the service request.

3. The method of claim 2, further comprising transmitting, after detecting recovery of the service processing server from the failure, a service availability notification to the vehicle terminal based on the stored information.

4. The method of claim 3, wherein the detecting of the recovery of the service processing server is based on receiving a service recovery notification from the service processing server.

5. The method of claim 1, wherein the service error response is transmitted by the gateway server to prevent the vehicle terminal from retransmitting the second service request.

6. A system comprising:

a gateway server configured to:

based on receiving a first service request from a vehicle terminal associated with a vehicle, forward the first service request to a service processing server responsible for processing a service corresponding to the received first service request;

based on receiving a service response from the service processing server, transmit the service response to the vehicle terminal to provide a connected car service to the vehicle;

detecting a failure in the service processing server by receiving, from the service processing server, a service failure notification; and based on receiving a second service request after detecting the failure in the service processing server:

transmit a service error response to the vehicle terminal; and stop forwarding the second service request to the service processing server.

7. The system of claim 6, wherein the gateway server is further configured to, based on receiving the second service request after detecting the failure in the service processing server, store information associated with the second service request.

8. The system of claim 7, wherein the gateway server is further configured to, after detecting recovery of the service processing server from the failure, transmit a service availability notification to the vehicle terminal based on the stored information.

9. The system of claim 8, wherein the gateway server is further configured to:

detect the recovery of the service processing server based on receiving a service recovery notification from the service processing server.

10. The system of claim 7, wherein the stored information comprises a request time.

11. The system of claim 7, wherein the stored information comprises an identification of the vehicle terminal.

12. The system of claim 6, wherein the gateway server is further configured to transmit the service error response to prevent the vehicle terminal from retransmitting an additional service request.

13. The system of claim 6, wherein the service response comprises information to be output via an output device of the vehicle terminal.

14. The system of claim 6, wherein the first service request is based on a user input received via the vehicle terminal.

15. The system of claim 6, wherein the service error response is configured to cause the vehicle terminal to display the service failure notification.

16. The system of claim 6, wherein the service error response is configured to cause the vehicle terminal to deactivate retry of the service.

17. The system of claim 6, wherein the service error response comprises a second service response having a specific field that is set to a predetermined value.

18. The system of claim 6, wherein the connected car service comprises at least one of a weather service or a traffic information service.

19. The system of claim 6, wherein the service failure notification is automatically sent by the service processing server to the gateway server based on communication between the gateway server and the service processing server having a normal status.

20. A system comprising:

a plurality of service processing servers; and a gateway server configured to:

based on receiving, from a vehicle terminal associated with a vehicle, a first service request for a first service, forward the first service request to a first service processing server of the plurality of service processing servers;

based on receiving a second service request for a second service, forward the second service request to a second service processing server of the plurality of service processing servers;

based on receiving a service response from the first service processing server or the second service processing server, transmit the service response to the vehicle terminal; and based on receiving a third service request for a specific service handled by one of the plurality of service processing servers after detecting a failure in a corresponding service processing server;

transmit a service error response to a corresponding vehicle terminal that transmitted the third service request for the specific service; and stop forwarding the third service request, to the corresponding service processing server.

* * * * *